(12) United States Patent
Wilbur et al.

(10) Patent No.: US 6,511,954 B1
(45) Date of Patent: Jan. 28, 2003

(54) OIL DEGREASER WITH ABSORBENT AND METHOD

(75) Inventors: Wesley S. Wilbur, Norton Shores, MI (US); David K. Wilbur, Nunica, MI (US)

(73) Assignee: Scoda America, Inc., Muskegon, MI (US)

( * ) Notice: Subject to any disclaimer, the term of this patent is extended or adjusted under 35 U.S.C. 154(b) by 60 days.

(21) Appl. No.: 09/716,697

(22) Filed: Nov. 20, 2000

(51) Int. Cl.[7] .............................. C11D 1/70; C11D 3/44
(52) U.S. Cl. ....................... 510/417; 510/174; 510/365; 510/505; 510/506; 134/42
(58) Field of Search .................. 510/417, 365, 510/505, 506, 174; 134/42

(56) References Cited

U.S. PATENT DOCUMENTS

| | | | |
|---|---|---|---|
| 4,869,842 A | * | 9/1989 | Denis |
| 5,281,354 A | * | 1/1994 | Faber |
| 5,863,881 A | | 1/1999 | Vlasblom ................ 510/365 |
| 5,908,707 A | | 6/1999 | Cabell et al. ........... 428/537.5 |
| 5,990,067 A | | 11/1999 | Franssen et al. ........... 510/240 |
| 6,071,867 A | | 6/2000 | Purcell et al. ............. 510/174 |
| 6,090,769 A | | 7/2000 | Vlasblom ................ 510/365 |
| 6,093,689 A | | 7/2000 | Vlasblom ................ 510/365 |
| 6,100,227 A | | 8/2000 | Burlew .................. 510/245 |

OTHER PUBLICATIONS

Concrete & Wood Degreaser label, Stock No. AJ1500, Advantech International, Inc., Madison Heights, MI, 48071.

* cited by examiner

Primary Examiner—Gregory E. Webb
(74) Attorney, Agent, or Firm—Price, Heneveld, Cooper, DeWitt & Litton

(57) ABSTRACT

An emulsion is provided that comprises a degreaser containing D-limonene along with an absorbent for cleaning oil spills. The composition is a degreaser and absorbent in an emulsion with the active ingredient D-limonene. Also provided is a method of cleaning stains off hard surfaces using a composition having a degreaser and an absorbent.

8 Claims, 1 Drawing Sheet

OIL DEGREASER WITH ABSORBENT AND METHOD

BACKGROUND OF THE INVENTION

The present invention relates to a chemical formulation useful as a cleaner, degreaser, and remover of oil stains and/or spills. The present formulation is particularly useful in removing hydrocarbon stains including, but not limited to, petroleum based, animal based, vegetable based, and mineral based products as well as synthetic products from porous surfaces including, but not limited to, concrete, wood, stone, masonry, fabric, synthetic and other oil absorbing substrates.

Formulations for oil degreasers, capable of removing oil stains from various surfaces, are known. Typically, these oil remover compositions included halogens and so-called "alkaline builders." Other compositions include a mixture of detergents with water used to clean oil stains. Many of the prior formulations have been simple blends or mixtures of oil degreasers. The problem with blends or mixtures is that the blended materials separate, making proper use of the composition difficult. Furthermore, many of the substances previously used for removing oil stains and spills are hazardous to the environment.

Still others have developed machines and procedures that may be useful in removing oil stains from concrete surfaces including grinding clay and sand mixtures into concrete surfaces. However, such machines and procedures can be difficult to use and costly.

Thus, there exists a need for compositions that are economical and effective in removing oil stains from a variety of surfaces that protect the surfaces and minimize safety and environmental hazards.

SUMMARY OF THE INVENTION

The present invention is a composition generally comprising an essential oil, a surfactant effective to form a microemulsion, and an absorbent. The composition accomplishes cleaning/degreasing of oil stained surfaces by contacting such stained surfaces with a particular formulation designed to remove such oil stains in a simple, easy, and safe manner. The stains that may be removed include, but are not limited to, petroleum based, motor oil, hydraulic oil, mineral oil, transmission fluid, power steering fluid, brake fluid, gasoline, kerosene, diesel, heating oil, crank case oil, grease, lithium grease, white grease, cutting oil, vegetable fat, vegetable oil, lard, margarine, cooking oil, animal waste and horse manure stains. A preferred formulation of the present invention includes a degreaser and an absorbent in the form of an emulsion.

The formulation includes a volatile oil or essential oil, such as a terpene. The preferred terpene is D-limonene. D-limonene is a biodegradable product typically derived from orange rind oil. D-limonene, also known as citrus solvent, acts as the active ingredient. D-limonene is structurally related to isoprene and is employed as a solvent and/or surface agent (surfactant) in the present formulation.

The present invention also includes a method of removing oil stains from a surface where the method comprises the steps of providing a stain removal microemulsion composition that comprises an essential oil, a surfactant effective to form a microemulsion, and an absorbent; applying said stain removal microemulsion composition to an oil stain on a surface; allowing said composition to dry; and removing the dried absorbent material from the surface.

These and other features, advantages and objects of the present invention will be further understood and appreciated by those skilled in the art by reference to the following specification, claims, and appended drawings. A more detailed description of the present invention shall be discussed further below.

DETAILED DESCRIPTION OF THE PREFERRED EMBODIMENT

Figure 1:
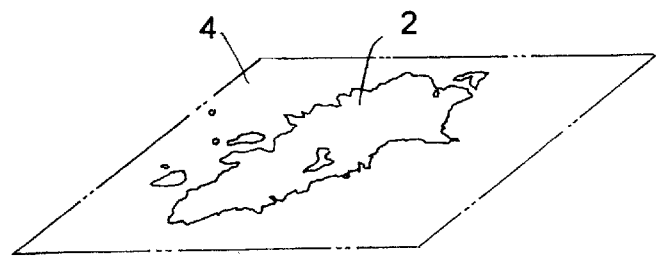
FIG. 1 is a plan view of an oil stain on a concrete surface.

The oil degreaser composition of the present invention comprises an absorbent and a liquid degreaser in an emulsion.

The degreaser comprises a cyclic hydrocarbon solvent. The cyclic hydrocarbon solvent may be present in the inventive formula of the concentration from about one to about 98 weight percent. Preferably, the concentration is from about 25 to about 75 weight percent. Most preferably, the concentration of cyclic hydrocarbon solvent is about 56 weight percent.

The cyclic hydrocarbon solvent according to the present invention is preferably a terpene. Terpenes are derivatives of isoprene. Terpenes may be acylic (open chain), monocyclic (one ring), bicyclic (two rings), tricyclic (three rings), or other variations. Also contemplated as useful in the present invention are terpene derivatives, such as alcohols and aldehydes, which are sometimes referred to as terpenoids. Suitable essential oils or actives thereof to be used in the microemulsions herein are those essential oils which exhibit degreasing activity. By "actives of essential oils" it is meant herein any ingredient of essential oils that exhibits degreasing activity. A further advantage of the essential oils and inactives used with the present invention is that they may impart a pleasant odor to these microemulsions without the need of adding a perfume. Indeed, the microemulsions according to the present invention deliver not only excellent degreasing performance on stain surfaces, but also a neutral or good scent, which include such terpene-based components having the general chemical formula of $C_{10}H_{16}$. The preferred terpene compositions of the present invention include D-limonene, alpha-terpineol, beta-terpineol, alpha-pinene, beta-pinene, 1-methyl-4-isopropylene-1-cyclohexane, and alcohols of such compositions. The particularly preferred terpene is D-limonene.

D-limonene is a terpene which occurs naturally in all plants. It is a monocyclic unsaturated terpene which is generally a by-product of the citrus industry, derived from the distilled rinds of oils of oranges, grapefruits, lemons, and the like. D-limonene exhibits low human toxicity and is considered environmentally safe. It functions in the present invention as a portion of the solvent phase, for solubilizing the oil stain and as an absorbent for benzene contained in the oil. Furthermore, D-limonene exhibits excellent solubility for the higher bithumen and asphaltane compounds commonly found in petroleum sludges.

Another essential element of the present invention is a surfactant or a mixture of surfactants. A surfactant is needed to form the microemulsions according to the present invention because it allows dispersal of the oily phase, i.e. droplets comprising the essential oil or an active thereof in an aqueous phase of the oil-in-water microemulsions of the present invention. In other words, in the absence of any surfactant, the present microemulsions would not form because the dispersed oily phase would tend to quickly grow and separate from the aqueous phase. Thus, the presence of a surfactant or mixtures thereof allows control of the size of the droplets comprising the essential oil or active thereof according to the present invention.

It is understood that the surfactant to be used or mixtures of surfactants as well as the levels thereof are chosen, depending on the nature and level of the essential oil or active thereof, so as to form the microemulsions according to the present invention. Typically, the microemulsions comprise from about 0.01% to 40% by weight of the total microemulsion of a surfactant or mixtures thereof, preferably from 0.05% to 15%, and more preferably from 0.1% to 12%. Suitable surfactants to be used in the present invention include any surfactant known to those skilled in the art as being able to form a microemulsion as defined herein, comprising the essential oil or an active thereof, when adding to an aqueous composition including the essential oil or active thereof. Suitable surfactants include nonionic, anionic, cationic, amphoteric and/or zwitterionic surfactants. Said surfactants are also desirable as they contribute to the cleaning performance of present microemulsions. Suitable surfactants used in the present invention include E-Z-Mulse® by Florida Chemical Co. of Winter Haven, Fla. and Triton® X-45 by Union Carbide of Wilmington, Del. In a preferred embodiment of the present invention, where the microemulsions herein are particularly suitable for the cleaning of a hard surface, the surfactant is typically a surfactant system comprising E-Z-Mulse® and Triton® X-45.

Examples of nonionic surfactants that can be employed are alkoxylated alkyl phenols, amides, amines, ethoxylated or propoxylated higher aliphatic alcohols, and sulphonamides. These surfactants include sorbitan esters of $C_{10}$ to $C_{22}$ fatty acids, polyoxyethylene sorbitan esters of $C_{10}$ to $C_{22}$ fatty acids, polyoxyethylene sorbitol esters of $C_{10}$ to $C_{22}$ fatty acids, polyoxyethylene derivatives of $C_6$ to $C_{20}$ fatty phenols, and polyoxyethylene condensates of $C_{10}$ to $C_{22}$ fatty acids or fatty alcohols. Other suitable nonionic surfactants include sorbitol monolaurate propylene oxide condensates, sorbitol monomyristate propylene oxide condensates, sorbitol monostearate propylene oxide condensates, dodecyl phenol propylene oxide condensates, myristyl phenol propylene oxide condensates, octylphenol propylene oxide condensates, nonlyphenol propylene oxide condensates, stearyl phenol propylene oxide condensates, lauryl alcohol propylene oxide condensates stearyl alcohol propylene oxide condensates, secondary alcohol propylene oxide condensates such as $C_{14}$–$C_{15}$ secondary alcohols condensed with propylene oxide, sorbitan tristearate condensed with propylene oxide, sorbitan trioleate condensed with propylene oxide, and sorbitan trioleate. Polyoxyethylene and polyoxypropylene analogs of the above surfactants also can be used in the present invention.

Cationic surfactants useful in this invention include the quaternary ammonium surfactants such as $C_{10}$ to $C_{22}$ fatty ammonium compounds, $C_{10}$ to $C_{22}$ fatty morpholine oxides, propylene oxide condensates of $C_{10}$ to $C_{22}$ fatty acid monoesters of glycerins, the mono- or diethanol amides of $C_{10}$ to $C_{22}$ fatty acids, and alkoxylated siloxane surfactants containing propylene oxide units and/or propylene oxide units. As is known in the surfactant art, the counterion for quaternary ammonium surfactants is usually a halide, sulfate, or methylsulfate, the chlorides being the most common industrially available compounds. Other suitable cationic surfactants suitable for use in the present invention include straight chain alkyl fatty amines, quaternary ammonium salts, alkyl-substituted quaternary ammonium salts, alkylaryl-substituted quaternary ammonium salts, quaternary imidazolinium salts, amine oxides, fatty amine oxides, tri-fatty amine oxides, tri-quaternary phosphate esters, amphoglycinate phosphates, amine acetates, long chain amines and their salts, diamines and their salts, polyamines and their salts, polyoxyethylenated long chain amines, and quaternized polyoxyethylenated long chain amines.

Anionic surfactants useful in this invention generally include alkali metal, ammonium and magnesium salts of alpha olefin sulfonates, alkyl sulfonates, alkylaryl sulfonates, alkylaryl ether sulfates, alkylether sulfates, sulfated alcohol ethoxylates, taurates, petroleum sulfonates, alkylnapthalene sulfonates, alkylsarcosinates and the alkylsulfosuccinates.

Preferred anionic surfactants useful in this invention include sodium lauryl sulfonate, ammonium lauryl sulfonate, dodecyl benzene sulfonate, sodium lauryl ether sulfate, diethanolamine lauryl sulfate, ammonium salts of sulfated alcohol ethoxylates, sodium cocoyl isethionate, sodium N-methyl-N-oleoyl taurate, sodium N-methyl-N-cocyl taurate, triethanolamine lauryl sulfate, disodium monooleamide PEG-2 sulfosuccinate, petroleum sulfonate sodium salt, alkyl napthalene sodium sulfonates, sodium lauroyl sarcosinate, and sodium alkyl sulfosuccinate. Other useful anionic surfactants include sodium or potassium dodecyl sulfate, sodium trioleate, sodium or potassium stearyl sulfate, sodium or potassium dodecyl benzene sulfonate, sodium or potassium stearyl sulfonate, triethanol amine salt of dodecyl sulfate, sodium laurate, sodium or potassium myristate, and sodium or potassium stearate.

Amphoteric surfactants useful in this invention generally include betaines, sultaines, imidazoline derivatives and the like. Specific amphoteric surfactants useful in this invention include ricinoleamidopropyl betaine, cocamidopropyl betaine, stearyl betaine, stearyl amphocarboxy glycinate, sodium lauraminopropionate, cocoamidopropyl hydroxy sultaine, disodium lauryliminodipropionate, tallowiminodipropionate, cocoamphocarboxy glycinate, cocoimidazoline carboxylate, lauric imidazoline monocarboxylate, lauric imidazoline dicarboxylate, lauric myristic betain, cocoamidosulfobetaine, alkylamidophospho betain and the like. Other useful amphoteric surfactants include decyl amino betaine; coco amido sulfobetaine, oleyl amido betaine, coco imidazoline, coco sulfoimidazoline, cetyl imidazoline, 1-hydroxyethyl-2-heptadecenyl imidazoline, 1-hydroxyethyl-2 mixed heptadecenyl heptadecadienyl imidazoline, and n-coco morpholine oxide.

The foregoing compounds have been described with particular reference to fatty derivatives. It is the fatty moiety that usually forms the lipophilic moiety. A common fatty group is an alkyl group of natural or synthetic origin. In most instances, the alkyl group may be replaced by the corresponding ethylenically saturated group having one or more ethylene linkages such as commonly occur in nature. Common unsaturated groups are oleyl, linoleyl, decenyl, hexadecenyl, and dodecenyl groups. In appropriate cases, the alkyl group may be cyclic, (cycloalkyls), or may be a straight or branched chain.

Any combination of nonionic, cationic, anionic, or amphoteric surfactants can be used in the present invention.

It may be preferable in certain embodiments of the present invention to include a mixture of surfactants. In all embodiments, the surfactant selected is effective to form a microemulsion in the final composition.

The surfactants are preferably E-Z-Mulse® and Triton® X-45. E-Z-Mulse® in a surfactant blend. These are excellent cleaning surfactants and effective emulsifiers for D-limonene and other terpenes to form an oil-in-water emulsion. These are very biodegradable and facilitate the formulation of a dilutable microemulsion concentrate.

The aqueous phase of the microemulsions of the present invention comprise an absorbent(s) as an essential ingredient. Suitable absorbents to be used herein include any compound capable of bringing the oil particles to the surface and drying into a solid form. Any absorbent known to those skilled in the art may be suitable to be used herein including Celatom® FW-60 Diatomaceous Earth by ABN Amro Bank of New York, N.Y. and Harborliteg® 905 Perlite by Harborlite Corp. of Vicksburg, Mich., which are the most preferred to be used in the microemulsions according to the present invention. Typically, the microemulsions herein comprise from 1% to 40% by weight of the total microemulsion of the absorbents or mixtures thereof, preferably from 5% to 20%, and more preferably from 10% to 15%.

The absorbent layer acts as an insulator to slow the evaporation of the surfactant, D-limonene and solvent which allows it to work longer, more effectively, and deeper into the concrete. The absorbent layer brings the oil to the surface which becomes available for removal once the absorbent layer dries. When completely dry, the powder is simply swept up or vacuumed and the stain is gone.

The microemulsions of the present invention may comprise, as a preferred optional ingredient, an alkaline builder. Such optional ingredients are suitable herein because they assist/promote the preferred pH.

The particular preferred components, listed as weight percents of the total composition, are described in the following example:

Example

| Item | Weight | Percentage | Raw Material: Item and Description |
| --- | --- | --- | --- |
| #1 | 600.0 lbs. | 55.86 | D-limonene (Terpene) |
| #2 | 15.0 lbs. | 1.40 | E-Z-Mulse ™ (Surfactant blend) |
| #3 | 7.5 lbs. | 0.70 | Triton ™ X-45 (Surfactant) |
| #4 | 150.0 lbs. | 13.97 | Water |
| #5 | 150.0 lbs. | 13.97 | Water |
| #6 | 16.4 lbs. | 1.53 | Sodium Metasilicate Pentahydrate (Alkaline Builder) |
| #7 | 25.0 lbs. | 2.33 | Celatom FW-60 Diatomaceous Earth (Absorbent) |
| #8 | 110.0 lbs. | 10.24 | Harborlite 905 Perlite (Absorbent) |

Equipment
  TANK-A is a 150-gallon mixing tank.
  TANK-B is a 30-gallon mixing tank.
  Mixers are Myers Mixers with planetary blades with high-speed dispersers.
Directions
  Step 1: Place all of ITEM #1 into TANK-A.
  Step 2: Slowly add ITEM #2 into agitating TANK-A.
  Step 3: Slowly add ITEM #3 into agitating TANK-A.
  Step 4: Allow TANK-A to mix5 minutes at moderate agitation, creating a slight vortex.
  Step 5: Slowly add ITEM #4 to agitating mixture in TANK-A.
  Step 6: Place ITEM #5 into separate mixing TANK-B.
  Step 7: Slowly add ITEM #6 to TANK-B while agitation. Allow to completely dissolve.
  Step 8: Slowly add TANK-B into TANK-A and allow to mix at medium agitation for 5 minutes.
  Step 9: Slowly add ITEM #7 and ITEM #8 into TANK-A while under moderate agitation.
  Step 10: Mix TANK-A for additional 10 minutes at moderate agitation and product is complete.

Figure 2:
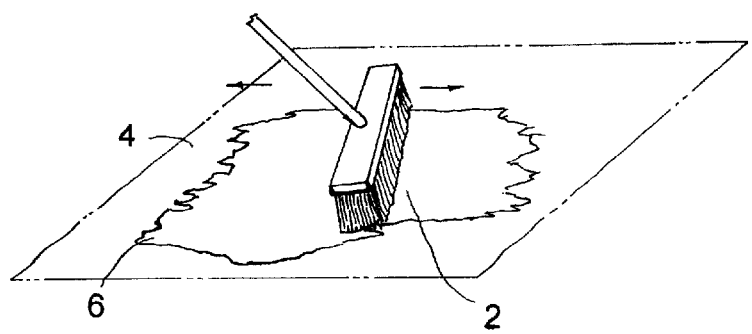
FIG. 2 is a plan view of the liquid composition of the present invention as it is applied to the stained area in FIG. 1.
Figure 3:
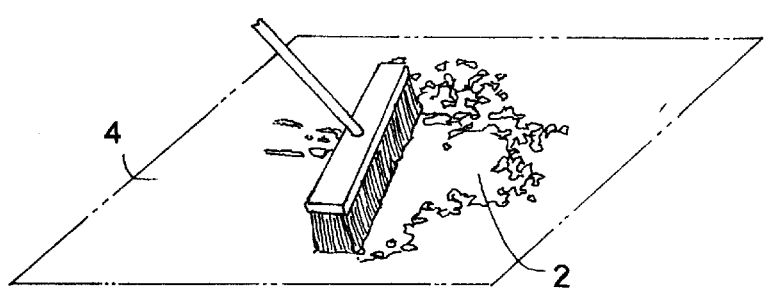
FIG. 3 is a plan view of the absorbent powder being swept up from the concrete surface in FIG. 1.

In operation, the liquid microemulsion composition of the present invention is applied to the oil stained surface. The liquid soaks down into the pores of the surface. The composition combines with the oil particles and pulls them to the surface, where they are trapped in the absorbent powder. When the composition is completely dry, the powder is simply swept up or vacuumed, leaving the surface free of the stain. This process is shown in the attached drawings. FIG. 1 illustrates an oil stain 2 on a concrete surface 4. A solution 6 according to the present invention is applied to the surface 4 where the oil stain 2 is located. The solution 6 may be brushed into the surface 4 and oil stain 2 with a broom 8 (see FIG. 2). Once the solution 6 has dried, a powder 10 is left, containing the oil particles of the oil stain 2. As shown in FIG. 3, the powder 10 may be removed with a broom 8 or by any other means, such as with a vacuum.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A microemulsion composition comprising:
   an essential oil;
   a surfactant comprising an alkoxylated alkyl phenol and a terpene emulsifier; and
   an absorbent.

2. A microemulsion composition comprising:
   an essential oil;
   a surfactant effective to form a microemulsion; and
   an absorbent comprising diatomaceous earth and perlite.

3. A method for removing oil stains from a surface, the method comprising the steps of:
   providing a stain removal microemulsion composition that comprises an essential oil, a surfactant effective to form a microemulsion, and an absorbent;
   applying said stain removal microemulsion composition to an oil stain on a surface;
   allowing said composition to dry; and
   removing the dried absorbent material from the surface.

4. The method of claim 3, wherein said dried absorbent material is swept away.

5. The method of claim 3, wherein said dried absorbent material is vacuumed.

6. A method for removing stains from a surface, the method comprising the steps of:

provided a stain removal microemulsion composition that comprises an essential oil, a surfactant effective to form a micro-emulsion, and an absorbent;

applying said stain removal microemulsion composition to a stain on a surface;

allowing said stain removal microemulsion composition to dry; and removing the dried absorbent material from the surface.

7. The method of claim 6, wherein said dried absorbent material is swept away.

8. The method of claim 6, wherein said dried absorbent material is vacuumed.

* * * * *

UNITED STATES PATENT AND TRADEMARK OFFICE
CERTIFICATE OF CORRECTION

PATENT NO. : 6,511,954 B1  Page 1 of 1
DATED : January 28, 2003
INVENTOR(S) : Wesley S. Wilbur and David K. Wilbur It is certified that error appears in the above-identified patent and that said Letters Patent is hereby corrected as shown below:

Column 5,
Line 19, "Harborliteg®" should be -- Harborlite® --;

Column 6,
Line 1, "mix5" should be -- mix 5 --;

Signed and Sealed this

Eighth Day of April, 2003

JAMES E. ROGAN
*Director of the United States Patent and Trademark Office*